United States Patent [19]

Fagan

[11] Patent Number: 4,925,699
[45] Date of Patent: May 15, 1990

[54] METHOD OF FORMING A FILM OF COOKING OIL ON A PAN SURFACE

[75] Inventor: John E. Fagan, Norman, Okla.

[73] Assignee: Burford Corp., Maysville, Okla.

[21] Appl. No.: 231,588

[22] Filed: Aug. 8, 1988

Related U.S. Application Data

[63] Continuation of Ser. No. 937,961, Dec. 4, 1986, abandoned, which is a continuation-in-part of Ser. No. 796,083, Nov. 7, 1985, abandoned.

[30] Foreign Application Priority Data

Nov. 7, 1986 [WO] PCT Int'l Appl. .................. PCT/US86/02416

[51] Int. Cl.⁵ .............................................. B05D 1/04
[52] U.S. Cl. ........................................ 427/28; 427/33
[58] Field of Search ....................... 427/26, 27, 28, 32, 427/33; 118/DIG. 8, 622, 636

[56] References Cited

U.S. PATENT DOCUMENTS

| | | | |
|---|---|---|---|
| 2,453,527 | 11/1948 | Mero | 118/682 |
| 2,526,763 | 10/1980 | Miller | 118/630 |
| 2,633,820 | 4/1953 | Koerber | 118/685 |
| 2,754,227 | 7/1956 | Ransburg | 118/622 X |
| 2,764,508 | 9/1956 | Feick | 239/696 |
| 2,884,338 | 4/1959 | Jenison | 427/32 X |
| 2,888,362 | 5/1959 | Starkey | 427/29 |
| 2,955,565 | 10/1960 | Schotland | 118/696 |
| 3,065,106 | 11/1962 | Rhodes et al. | 427/28 |
| 3,641,971 | 2/1972 | Walberg | 118/671 |
| 4,186,886 | 2/1980 | Sickles | 239/691 |
| 4,313,968 | 2/1982 | Sickles et al. | 427/27 |

*Primary Examiner*—Evan Lawrence
*Attorney, Agent, or Firm*—Crutsinger & Booth

[57] ABSTRACT

A method of forming a film of cooking oil on a pan surface wherein a mass of cooking oil is atomized to form droplets which are projected between a pair of electrodes having curved surfaces charged to a potential in a range between four and six kilovolts to electrically charge the droplets. The charged droplets are propelled at a velocity in a range between ten and twenty meters per second along a trajectory to impinge against an oppositely charged pan surface at an angle of greater than 45° relative to the plane of the pan surface to form an oil film on the pan surface.

3 Claims, 6 Drawing Sheets

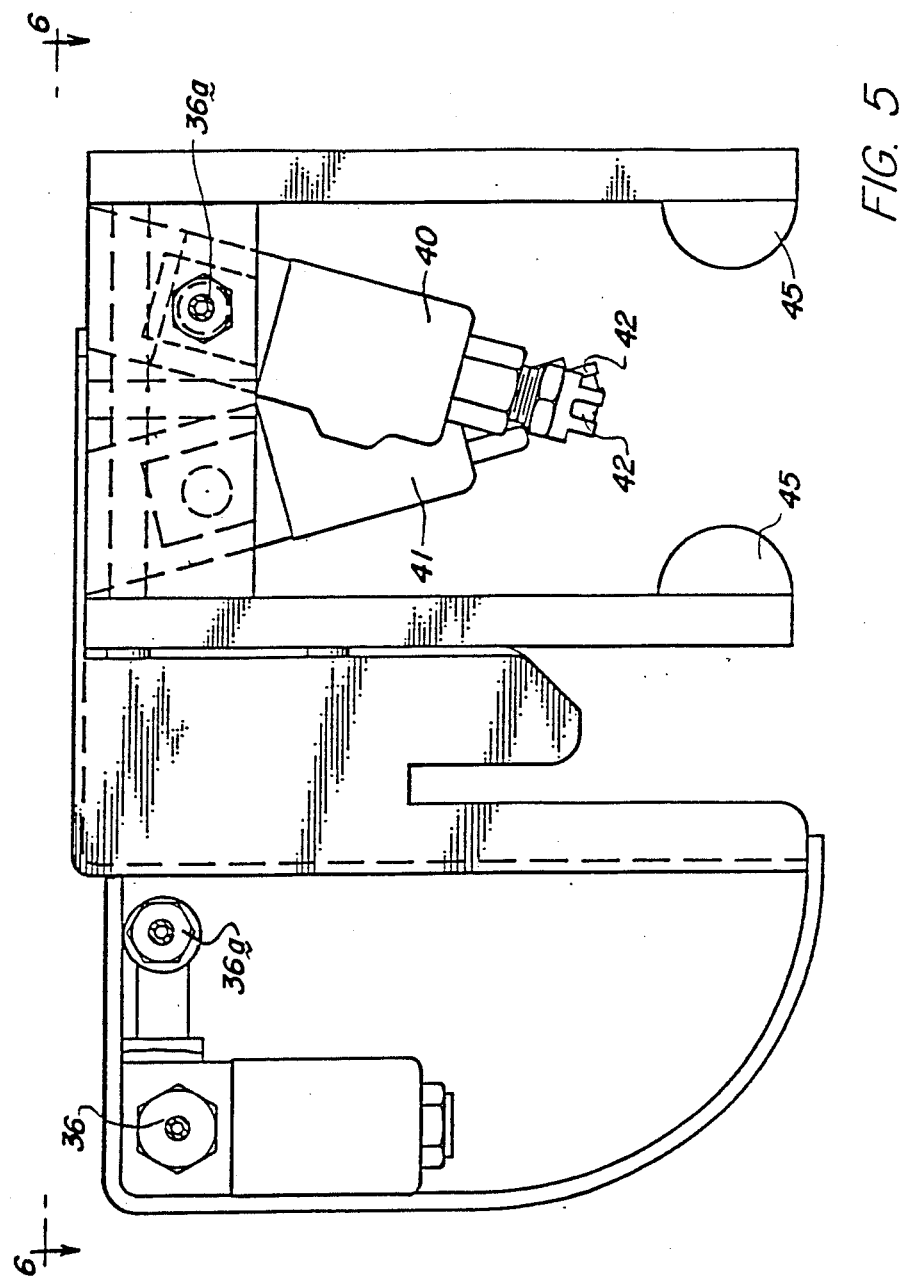

METHOD OF FORMING A FILM OF COOKING OIL ON A PAN SURFACE

This is a continuation of application Ser. No. 06/937,961 filed Dec. 4, 1986, abandoned, which is a continuation-in-part of application Ser. No. 796,083 filed Nov. 7, 1985, abandoned.

BACKGROUND OF THE INVENTION

Animal fat and vegetable oil are cooking oils which are conventionally applied to pan surfaces to prevent sticking of bakery products to the surface of the pan. Heretofore cooking oils have been sprayed into cooking pans to form a film. However, liquid sprayed through nozzles tends to form a very fine mist commonly referred to as "overspray" which does not adhere to the surface of the pan and results in contamination of the atmosphere in the vicinity of the pan or application of oil to surfaces around the pan.

A variety of oil spraying devices have been employed heretofore for pumping cooking oil through spray nozzles onto pans in commercial bakeries. Pressurized aerosol containers of cooking oil have also been employed. A mixture of partially hydrogenated soybean oil, alcohol, lecithin and a propellant is commercially available from Boyle-Midway, Inc. of New York, N.Y. under the registered trademark "PAM" which is commonly used for spraying pans.

SUMMARY OF THE INVENTION

The invention described herein incorporates an improved method of forming a thin film of cooking oil on the surface of a pan which is particularly adapted for use in commercial bakeries. A mass of cooking oil is atomized by forcing the liquid through a nozzle to form small oil droplets which are propelled between a pair of positively charged electrodes to, in the case of cooking oil that is conducting, or readily ionizable, ionize the droplets by stripping electrons from the droplets. Prior to atomizing the oil, it may be heated to adjust the viscosity and mixed with sodium chloride for increasing the conductivity of the oil. The ionized oil droplets are sprayed onto the surface of a cooking pan for forming a film on the surface.

For cooking oils that are nonconducting, or dielectric, the droplets are said to become electrically polarized, and the electrodes may be charged either positively or negatively. However, they must be shaped such that the electric field intensity in their vicinity is not too great, as would be the case with electrodes having a small radius of curvature.

The apparatus for carrying out the improved method comprises a pan sensor interfaced with electrical circuitry, incorporating time control devices, for energizing a valve driver for directing a spray of oil droplets between charged electrodes in a timed sequence to cause the charged droplets to be attracted to and impinge against a grounded surface of a pan on a conveyor.

BRIEF DESCRIPTION OF THE DRAWING

Drawings of a preferred embodiment of the invention are annexed hereto so that the invention may be better and more fully understood, in which:

FIG. 5 is a front elevational view of spray valves associated with a pair of electrodes;

DESCRIPTION OF A PREFERRED EMBODIMENT

Figure 1:
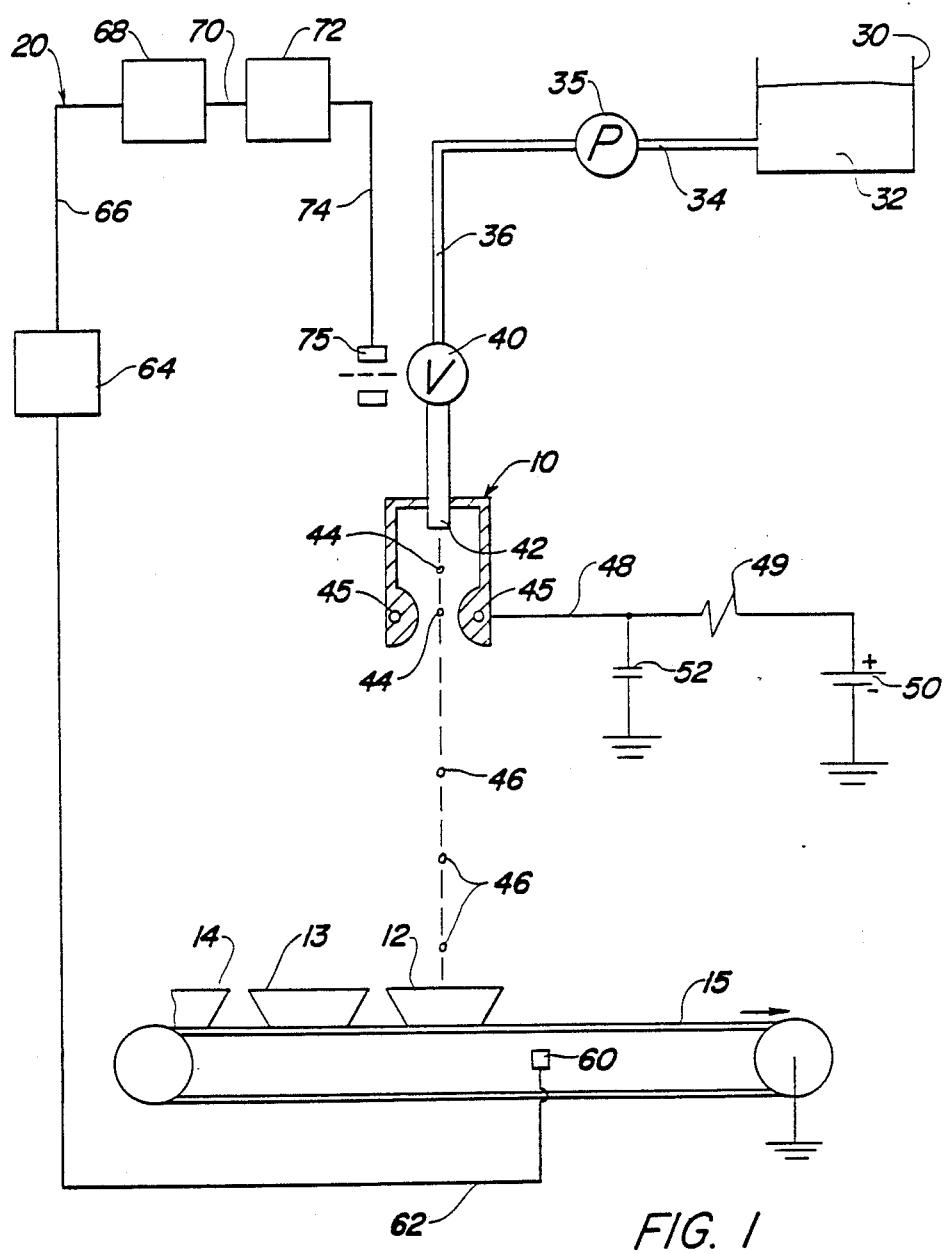
FIG. 1 is a schematic view of the spray system in relation to cooking pans carried on a conveyor.

Referring to FIG. 1 of the drawing, the numeral 10 generally designates an electrostatic oil sprayer for applying a film of oil to pans 12, 13 and 14 carried on a conventional conveyor 15, for example in a commercial bakery. Sprayer 10 is controlled by electrical circuitry generally designated by the numeral 20 to initiate and terminate spraying cycles in timed sequence with arrival and departure of pans 12, 13 and 14.

Figure 6:
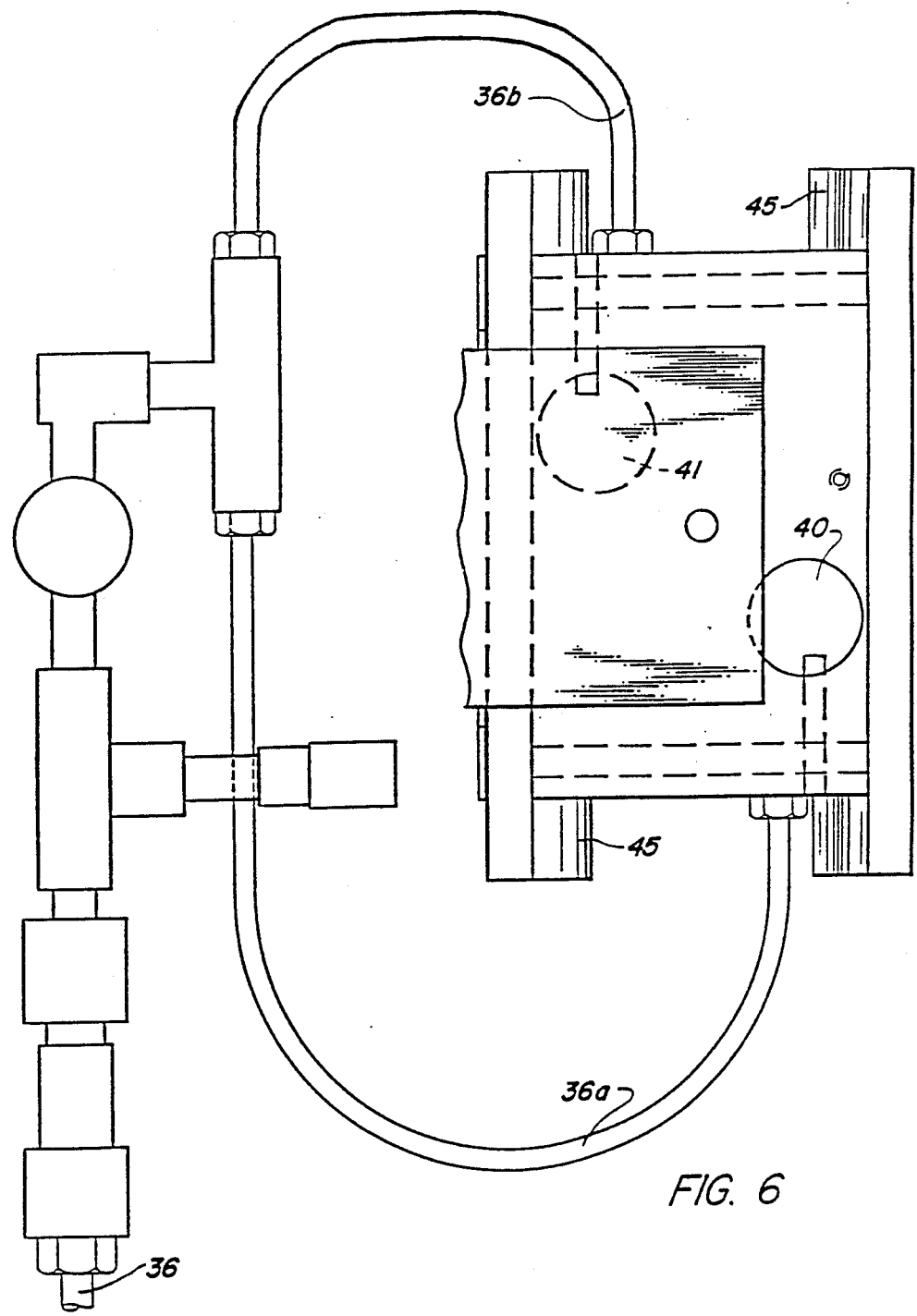
FIG. 6 is a top plan view looking in the direction of the arrows along lines 6—6 of FIG. 5.

The electrostatic oil sprayer 10 comprises a reservoir 30 containing a supply of oil 32 connected through conduit 34 to the suction side of pump 35. The pressure side of pump 35 is connected through conduit 36 and branch conduits 36a and 36b, as illustrated in FIGS. 5 and 6 of the drawing to spray valves 40 and 41, each incorporating an atomizing chamber and spray tip or nozzle 42. The mass of pressurized cooking oil received from pump 35 is broken up into small droplets by spray valves 40 and 41 and a fan spray having an angle of approximately 110° is dispensed from each of valves 40 and 41 through nozzle 42.

A pair of electrodes 45 is positioned adjacent each nozzle 42 such that the stream of droplets 44 flowing from each nozzle 42 will be directed between and in the vicinity of each of the electrodes.

The classical Millikan oil drop experiment indicates that oil droplets sprayed from an atomizer are electrically charged. The charge is usually negative meaning that the oil droplets have acquired one or more excess electrons.

Figure 4:
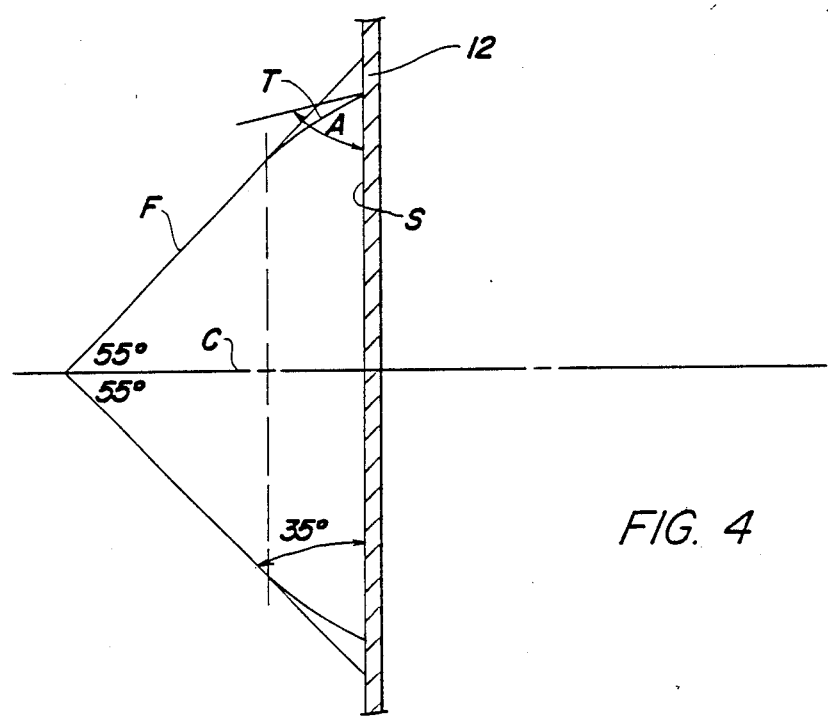
FIG. 4 is a diagrammatic view illustrating attraction of charged oil droplets to a pan.
Figure 3:
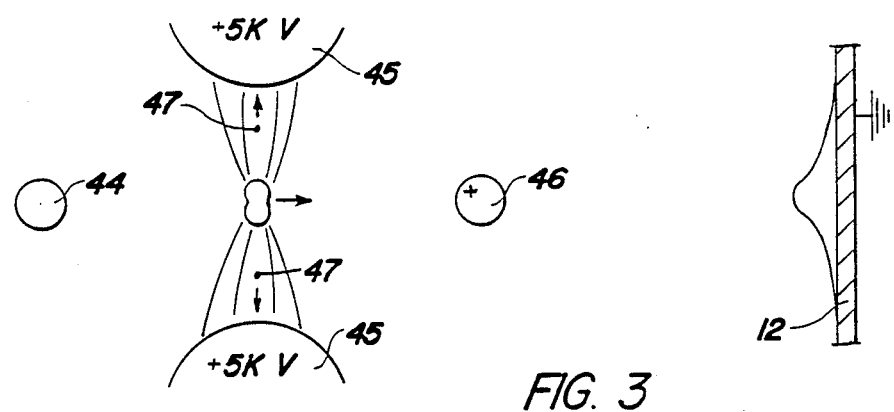
FIG. 3 is a diagrammatic view illustrating a spray pattern of charged oil particles.

As diagrammatically illustrated in FIGS. 3 and 4 of the drawing conducting, or readily ionizable, cooking oil droplets 44, whether neutral or carrying a negative charge, moving between electrodes 45 will liberate electrons to electrodes 45. Electrodes 45 are charged to an electrical potential in a range between four and ten kilovolts with respect to pans 12, 13 and 14 which are grounded. Ionized oil droplet 46, having given up one or more electrons, leaves the vicinity of electrodes 45 with a net positive charge.

The electrostatic force of attraction between ionized droplet 46 and the surface of pan 12 is governed by Coulomb's law which states that the force between two electric charges in free space is pure attraction or repulsion, and is given by the equation $$F = \frac{Q_1 Q_2}{4 E_o R^2}$$

Where $Q_1$ and $Q_2$ are the magnitudes of the charges in Coulombs,

R is the distance between the charges in meters, and
$E_o$ is the permittivity of free space, $8.84 \times 10^{-9}$ farads/meter
Otherwise stated, $$F = \frac{QE}{4 E_o}$$

where
E is the field strength, and
Q is the applied charge

As droplets 44 move between electrodes 45, work is done to separate electrons from the mass of droplets 44 to form ionized droplets 46. The electrical potential energy of droplets 44 is increased as droplets 44 liberate electrons to the high voltage electrodes 45.

The electric intensity on the outer skin of a charged spherical conductor is the same as though all of the charge on the conductor were concentrated at its center. The potential at all points on the skin of the conductor is the same. At points inside the sphere the electric intensity is zero.

The potential difference between ionized droplet 46 and pan 12 causes the droplet 46 to be electrically attracted by pan 12 and propelled along a trajectory directly to the surface of pan 12. This electrical attraction of pan 12 to the positively charged droplet 46 eliminates the possibility of "overspray" which has heretofore resulted from minute spray particles which tend to float in the air and settle on surfaces in the general vicinity of the pan.

Figure 7:
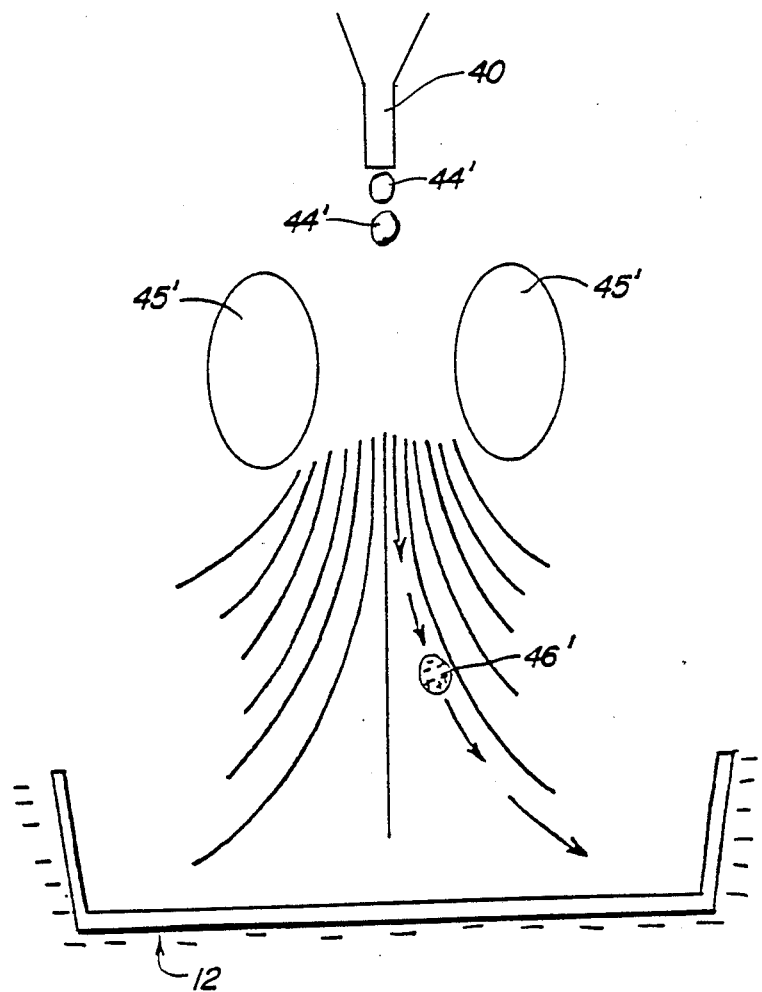
FIG. 7 is a diagrammatic view illustrating the electrical polarizing of non-conductive or dielectric oil droplets moving toward the surface of a pan. Like numeral references are employed to designate like parts throughout the various figures of the drawing.

As diagrammatically illustrated in FIG. 7 of the drawing, nonconducting, or dielectric, oil droplets 44', moving between positive electrodes 45' become electrically polarized droplets 46', with their surfaces adjacent to electrodes 45' having induced negative charges and their surfaces adjacent to pan 12, having induced positive charges of equal magnitude. (Alternatively, electrodes 45' may be negatively charged, in which case the induced surface charges would be positive, and negative, respectively).

Not nearly as high field potentials have to be used, and electrodes 45' are charged to an electrical potential in a range between four and six kilovolts with respect to pan 12, which is grounded.

Since a dielectric body in a nonuniform field always experiences a force urging it from a region where the field is weak toward a region where it is stronger, provided the dielectric coefficient of the body is greater than that of the medium in which it is immersed as is the case here, electrically polarized oil droplets 46' are steered to the surface of bread pan 12 along the electric stream lines, as is shown in FIG. 7. Also contributing to this, of course, is the force of gravity. This occurs without the individual molecules being torn down, thus leaving the structure of the cooking oil molecules intact.

Droplets 46' are steered through the electric field toward bread pan 12. Electrodes 45' must be shaped such that the electric field intensity in their vicinity is not too large, as would be the case with electrodes having a small radius of curvature. For example, small spherical electrodes or those containing sharp points or knife edges will cause the droplets to curl around the electrodes. For this reason, electrodes 45' are, for illustrative purposes, depicted as elliptical in shape. They are preferably made of a polycarbonate conductive plastic.

The principle of conservation of energy is applicable to the motion of the charged oil droplets 46 and 46' as they impinge against the surface of pan 12. The change in electrical potential energy and the change in kinetic energy of charged droplets 46 and 46' is employed to overcome the surface tension of the droplets and spread the droplets on the surface of the pan. By adjusting the speed, direction and potential gradient between droplets 46 and pan 12, and between droplets 46' and pan 12, the ability of droplets 46 and 46' to wet the surface of the pan to form an unbroken film while eliminating "overspray" is enhanced. Extremely fine particles of the liquid, having a very low mass, are accelerated and, "steered" to pan 12.

Reservoir 30 is preferably maintained in a temperature range between 50° C. (122° F.) and 95° C. (203° F.) to control the viscosity of the oil solution and to enhance atomizing the oil flowing from nozzles 42. For proper atomization the viscosity of the oil is preferably maintained in a range of about 130 to 150 Saybolt universal seconds.

As diagrammatically illustrated in FIG. 3 of the drawing droplet 44 moving between spaced electrodes 45 will be approximately equally attracted to each of the electrodes such that the momentum of the droplet will carry it through the field between the electrodes without causing significant deviation in the path of the droplet. Electrons 47 loosely held by the sodium and chloride atoms are subjected to a strong electrical attraction and are stripped from the droplet 44 to form the ionized droplet 46.

The center of the spray fan is directed substantially perpendicularly to the surface of pan 12 such that droplets moving in the outer extremities of the 110° spray will be directed along a path to impinge the plane of the surface of the bottom of pan 12 at an angle of approximately 35°. However, due to the "steering" of charged droplets 46 and 46' to the surface S of pan 12 the trajectory T of droplets 46 and 46' will deviate from the straight line path of an uncharged particle such that droplets 46 and 46' will impinge against surface S at an angle of incidence A of more than 45°.

The stream of liquid exiting nozzles 42 must have sufficient to atomize the liquid to form droplets 44 and 44' but should move as slowly as possible to remain between electrodes 45 and 45', respectively, for a sufficient time to permit charging of the droplets. If oil droplets 44 and 44' move between electrodes 45 and 45', respectively, at a velocity in a range between 10 and 20 meters per second, the droplets will be sufficiently charged.

Referring to FIG. 1 of the drawings, electrodes 45 for charging conducting cooking oil are charged to an electrical potential in a range between four and ten kilovolts through a conductor 48, and a 100 megohms resistor 49 by an electrical source 50. Electrodes 45' for charging nonconducting, or dielectric, cooking oil, are charged to a potential in a range between four and six kilovolts, and may be positive or negative. Electrical source 50 is of conventional design and comprises a transformer and rectifier circuit for converting, for example, 110 volts of alternating current electricity to 5,000 volts direct current. A capacitor 52 is connected from conductor 48 to ground to function as a spark arrester and to prevent injury to operators who might come in contact with electrodes 45 or 45'. A human body has a representative resistivity of about 100 kiloohms. Thus, if an operator contacts electrodes 45 or 45', the electrical charge on the capacitor is dumped and the operator receives about five volts. When the operator moves out of contact with electrode 45 or 45' capacitor 52 will be recharged over a time period of from one to two seconds and the potential of electrodes 45 or 45' will increase to five kilovolts.

It should be readily apparent that the provision of resistor 49 and capacitor 52 in the charging circuit provides a safety device and also prevents electrode arcs to pan 12.

Control circuit 20 comprises a transducer 60 of any suitable design for sensing the presence of pan 12. Transducer 60 may comprise a light emitting diode, magnetic switch or mechanically actuated microswitch to generate a signal through conductor 62 to a pan sensor module 64 to indicate the arrival and departure of pans 12, 13 and 14. Pan sensor module 64 delivers signals through conductor 66 to a suitable time delay device 68 which delivers signals through conductor 70 to a time duration device 72 which delivers signals through conductor 74 to valve driver 75. The valve driver 75 is of conventional design and preferably includes a solenoid actuator connected to valve 40 for initiating and terminating flow of oil through nozzle 42.

The time duration device 72 is of conventional design and is programmable to maintain valve actuator 75 in an energized condition to permit flow through valve 40 for a predetermined time interval to assure that valve 40 will cause charged particles 46 and 46' to be sprayed onto the surface of the pans to obtain a uniform film over the pan surface and terminate flow as the spray reaches the extremity of the surface to be coated.

Time delay device 68 is of conventional design and initiates the spraying cycle when the leading edge of the surface to be sprayed reaches a predetermined location.

Figure 2:
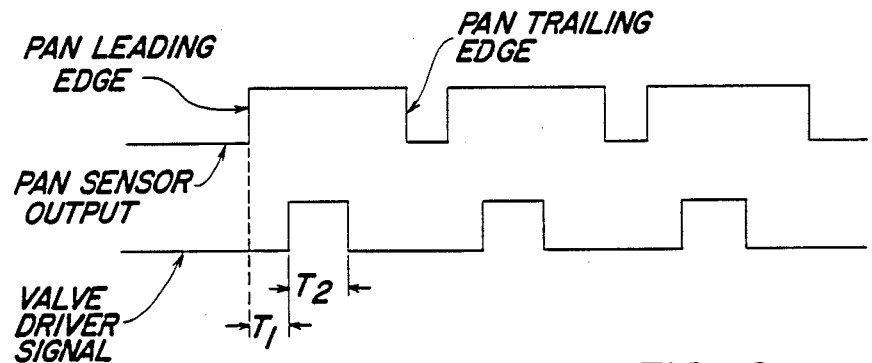
FIG. 2 is a timing diagram of the control system.

A typical timing diagram is illustrated in FIG. 2 of the drawing. Time T1 is the time delay determined by time delay device 68 between the arrival of the leading edge of the pan 12 and the time when the spraying cycle will be initiated. Time duration device 72 controls the duration T2 during which valve 40 is maintained in an open position between the time the spray cycle is initiated and terminated. The cycle is repeated as each pan moves into a position to be sprayed. It should be readily apparent that control circuit 20 initiates and terminates spraying cycles based on the presence of pans 12, 13, and 14, even though the pans may be irregularly spaced on conveyor 15.

For application of oil to pockets in bun pans wherein several rows and columns of recesses are formed in a single pan, a plurality of spray nozzles 42 are preferably positioned across the width of conveyor 15 and positioned to spray oil into each recess in the pan. The width of the area sprayed by each nozzle 42 can be adjusted by moving nozzle 42 either toward or away from conveyor 15 such that the width of the area sprayed by the 110° spray pattern will be increased as nozzle 42 is moved away from conveyor 15 and decreased as nozzle 42 is moved toward conveyor 15.

I claim:

1. A method of forming a film of cooking oil on a pan surface comprising the steps of: atomizing a mass of cooking oil to form droplets; projecting the droplets between a pair of electrodes having curved surfaces charged to a potential in a range between four and six kilovolts at a velocity in a range between ten and twenty meters per second to electrically charge the droplets; and propelling the charged droplets along a trajectory to impinge against an oppositely charged pan surface at an angle of greater than 45° relative to the plane of the bottom pan surface to form an oil film on the pan surface.

2. A method of forming a film of cooking oil on a pan surface comprising the steps of: atomizing a mass of cooking oil to form droplets; moving the oil droplets between a pair of electrodes having elliptically shaped surfaces charged to an electrical potential in a range between four and six kilovolts in magnitude to electrically charge the droplets of oil; and moving the charged droplets of oil in the vicinity of an oppositely charged pan surface to form an oil film on the pan surface.

3. A method of forming a film of cooking oil on a pan surface comprising the steps of: atomizing a mass of cooking oil to form droplets; electrically charging the droplets of oil; projecting the droplets at a velocity in a range between ten and twenty meters per second along a trajectory to impinge against an oppositely charged pan surface at an angle of greater than 45° relative to the plane of the pan surface to cause the droplets to spread over the pan surface and to be retained in contact therewith as the charge on the droplets is dissipated.

* * * * *